United States Patent

[11] 3,568,027

[72] Inventors James L. Bacon;
George W. Van Cleave, Lexington, Ky.
[21] Appl. No. 877,723
[22] Filed Nov. 18, 1969
[45] Patented Mar. 2, 1971
[73] Assignee International Business Machines Corporation
Armonk, N.Y.

[54] MOTOR CONTROL CIRCUIT WITH SYMMETRICAL TOPOLOGY
16 Claims, 8 Drawing Figs.
[52] U.S. Cl. ................................................. 318/331, 318/345, 323/22
[51] Int. Cl. ....................................................... H02p 5/16
[50] Field of Search ........................................ 318/331, 332, 345, 308; 323/75E, 322T

[56] References Cited
UNITED STATES PATENTS
| | | | |
|---|---|---|---|
| 3,275,925 | 9/1966 | Kupferberg | 323/22(K) |
| 3,388,316 | 6/1968 | Gately | 323/22(T) |

Primary Examiner—Oris L. Rader
Assistant Examiner—Robert J. Hickey
Attorneys—Hanifin and Jancin and D. Kendall Cooper ABSTRACT: The invention concerns a motor control circuit especially useful with small direct-current-type motors and featuring a symmetrical circuit topology that achieves motor regulation and temperature compensation in a simplified manner. The circuit includes an upper portion comprising a motor model section for establishing a reference voltage to determine the speed of the motor, a parallel circuit section including the motor itself, a lower section intended for detection of current changes in the motor section, and a difference amplifier interconnected with the motor model and motor sections for maintaining an essentially zero potential difference between these sections. The symmetrical layout achieves a highly accurate measure of control over motor speed once a nominal speed has been established. Due to the symmetrical configuration of the circuit, effects of temperature and humidity are essentially eliminated. Some provision is made for alternative ways of controlling the desired motor speed including a variable control for changing motor speed in a regular fashion throughout a desired range of speeds.

INVENTORS
JAMES L. BACON
GEORGE W. VANCLEAVE

BY: *D. Kendall Cooper*

ATTORNEY

MOTOR CONTROL CIRCUIT WITH SYMMETRICAL TOPOLOGY

BACKGROUND OF INVENTION, FIELD, AND PRIOR ART

The field of the invention pertains to circuits for regulating motor speed, particularly involving direct current motors operable from a direct current potential. Numerous motor control circuits have been proposed in the prior art including circuits that involve the sensing of motor speed by centrifugally operated contacts, tachometers, or other signal-generating means which, in most cases, detect the sensed signals representative of speed and supply a corrective potential to bring the speed back to a desired nominal level. Other circuits have utilized the electromotive force *EMF* exhibited by a motor during its operation to achieve motor speed regulation using essentially electronic circuit action techniques in contrast with the other arrangements that are, in some respects, electromechanical. Some prior circuits also make provision for temperature compensation. However, none of the prior art has been observed to be based on essentially symmetrical characteristics with certain features such as temperature compensation being handled inherently due to the circuit configuration as taught herein.

SUMMARY OF INVENTION

In accordance with the present invention, a motor control circuit incorporating a direct current motor is arranged with active elements, such as participating transistors of various types arranged in an essentially symmetrical configuration that operates with a high degree of efficiency and in a greatly simplified fashion when contrasted with prior circuits. The objective of the circuit is to maintain a constant back electromotive force *EMF* in order to establish a constant motor speed for all loads that may be encountered within a predetermined range of loads. The motor control circuit includes first and second circuit legs that are substantially symmetrical in layout. A first leg includes the motor itself as well as a transistor in series with the motor for sensing changes in current through the motor leg. The second leg is substantially identical with the first leg with the exception that it has a first transistor and associated components serving as a motor model against which the motor *EMF* is compared and matched. The second leg also includes in series with the motor model transistor another transistor that responds to the current-sensing transistor in the first leg to maintain potentials that are matched in the two legs. Means in the form of a potentiometer or comparable means is provided in the motor model section to establish a potential and to set the desired motor speed. A difference amplifier in the form of another transistor is interconnected between the first and second legs to serve as a common path for the balancing of potentials. The two symmetrically oriented legs of the motor network may also be considered as having upper and lower portions; and as will be seen, the potentials existing in the respective upper and lower portions are balanced against one another, both positive and negative, to maintain a desired nominal operating mode of the circuit. An important consideration of the circuit is that the motor speed is related to the established reference potential in a highly linear fashion. This means that the motor back *EMF* may be changed in a linear manner or a functional manner and will exactly conform with the setting of the reference potential throughout a range of operation. In order to conserve energies in the supply source, the second leg of the motor circuit is scaled up with a selected ratio in order to establish a higher impedance in the second leg. As an example, in one case, a ratio of 35 to 1 has been found suitable and, in another case, 15 to 1.

OBJECTS

Accordingly, an object of the invention is to provide a motor control circuit for regulating the speed of a motor in a highly efficient and simplified manner.

Another object of the invention is to provide a motor control circuit with provision for temperature compensation that is inherently a characteristic of the circuit and that requires no special components to accomplish.

A still further object of the invention is to provide a symmetrically oriented motor control circuit based on a simplified balancing of potentials to achieve regulation of motor speed.

A further object of the invention is to provide a motor control circuit for regulating the speed of the motor by establishing predetermined back *EMF* conditions in the circuit.

Also, an object of the present invention is to provide a motor regulating circuit that is operable throughout a range of motor potentials and corresponding motor speeds.

A still further object of the present invention is to provide facilities in a motor control circuit that insure a linear relationship of motor speed with respect to changes in control settings.

Also, an object of the invention is to provide a motor regulating circuit with self-compensating potentials that insure a rapid response of the circuit to changes in load conditions.

The foregoing and other objects, features, and advantages of the invention will be apparent from the following more particular description of the various embodiments of the invention as illustrated in the accompanying drawings.

THEORETICAL ASPECTS OF THE INVENTION

Figure 2:
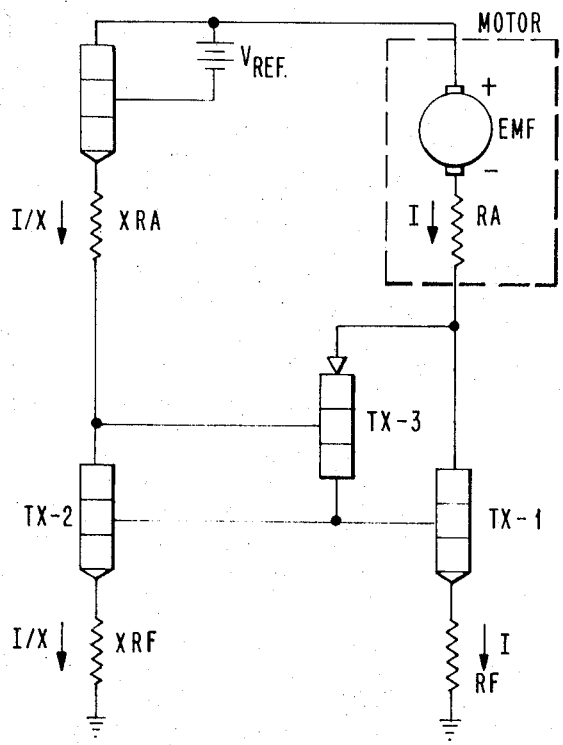
FIG. 2 is a circuit that is the simplified equivalent of that shown in FIG. 1.
Figure 3:
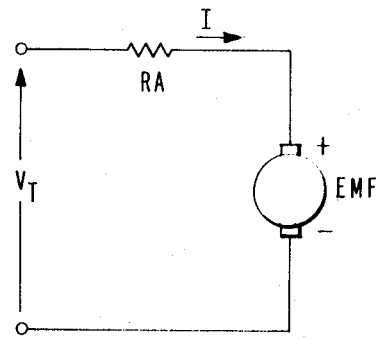
FIG. 3 is a simplified motor circuit diagram.

Before considering the detailed circuit operation of the motor control circuit according to the present invention, it is believed that a few fundamental theoretical principles will be found useful in considering the operating philosophy of the circuit described herein. Reference is particularly made to FIGS. 2 and 3 representing, respectively, a simplified equivalent circuit, and a simplified motor network.

The circuit makes use of the linear speed torque relation of ironless armature DC motors. Referring to FIG. 3, for these motors the terminal voltage is related to the back *EMF* and motor current in the following manner:

$$V_T = EMF + IR_A \quad (1)$$

Motor torque depends upon current in the following way:

$$T = K_T I \quad (2)$$

Motor speed and *EMF* are related by:

$$EMF = K_v W \quad (3)$$

Where $V_T$ is the terminal voltage of the motor
*EMF* is the electromotive force (voltage) generated by the motor
$I$ is the armature current of the motor
$R_A$ is the armature resistance of the motor
$T$ is the torque produced by the motor
$W$ is the angular velocity (speed) of the motor
$K_T$ is the torque constant of the motor
$K_v$ is the velocity constant of the motor The primary purpose of the invention is to hold speed constant with a varying lead. Since *EMF* is proportional to speed and armature current is proportional to torque, it suffices to hold the EMF constant with a varying current. Restating the above mathematically:

$$\frac{\partial W}{\partial T} = \frac{\partial EMF}{\partial I} = 0 \quad (4)$$

But $$EMF = V_T - IR_A \quad (1)$$

and $$\frac{\partial EMF}{\partial I} = \frac{\partial V_T}{\partial I} - \frac{\partial I}{\partial I} R_A \quad (5)$$

$$\frac{\partial EMF}{\partial I} = \frac{\partial V_T}{\partial I} - R_A = 0 \quad (5) \text{ and } (4)$$

Finally, to maintain constant speed with varying load, the result is $$\frac{\partial V_T}{\partial I} = R_A$$

In other words, if the slope of the $V_T - I$ curve is held equal to the value of $R_A$, the motor speed will not change with changes in torque.

Hence, the slope of the steady state speed-torque curve of the motor will be zero if the terminal voltage of the motor is adjusted in a manner to compensate for the IR drop of the armature resistance when the load current changes. The transient speed-torque behavior will depend upon the circuit and load time constants. It can be shown that if the circuit gain $$\frac{\partial V_T}{\partial I}$$

is larger than what is needed to maintain a zero speed torque slope, i.e.

$$\frac{\partial V_T}{\partial I} > R_A$$

the system becomes unstable. Therefore, in practice, it is desirable to "build in" a slightly negative speed-torque slope $$\left(\frac{\partial V_T}{\partial I} < Ra\right)$$

to insure stability.

Other circuit topologies will perform the function of adjusting the terminal voltage to correct speed with load changes. However, the circuit disclosed here has the advantages of simplicity of design, repeatability of gain, and excellent performance over wide temperature ranges.

The circuit topology as simplified in FIG. 2 is essentially a differential amplifier. The collector load of one leg of the amplifier is the motor. The second leg of the amplifier represents a scaled "model" of the motor, that is, a resistance which is some arbitrary multiple of the armature resistance of the motor and a constant voltage source to represent the back EMF of the motor is to remain constant. Transistor TX-3 maintains the voltage differential between the collectors of transistors TX-1 and TX-2 near zero (actually there is a $V_{be}$ offset) forcing the back EMF to be equal to $V_{REF}$. The initial running speed of the motor can be adjusted by adjusting $V_{REF}$.

When the load on the motor increases, the speed instantaneously drops, dropping the back EMF of the motor, causing transistor TX-3 to conduct harder thereby increasing the conduction of transistors TX-1 and TX-2 since there bases are tied together. The resistors in the emitter paths of transistors TX-1 and TX-2 are scaled by the same ratio as the collector resistors. Therefore, if the emitter current of transistor TX-1 increases by $\Delta I$ the emitter current of transistor TX-2 will increase by $\Delta I/X$. If the collector and emitter currents of each stage can be considered equal, transistor TX-1 will change $\Delta I$ and transistor TX-2 by $\Delta I/X$ and the drop across $RA$ WILL not be $(I + \Delta I) RA$ and in the other leg it will be $(I/X + \Delta I/X) X RA$ which can be seen exactly cancels the increased drop in the motor and again returns differences between the collectors of transistors TX-1 and TX-2 to zero. The back EMF will again be equal to $V_{REF}$, since both circuits increased their currents by the same percentage of the original current.

DETAILED DESCRIPTION OF CIRCUIT

Figure 1:
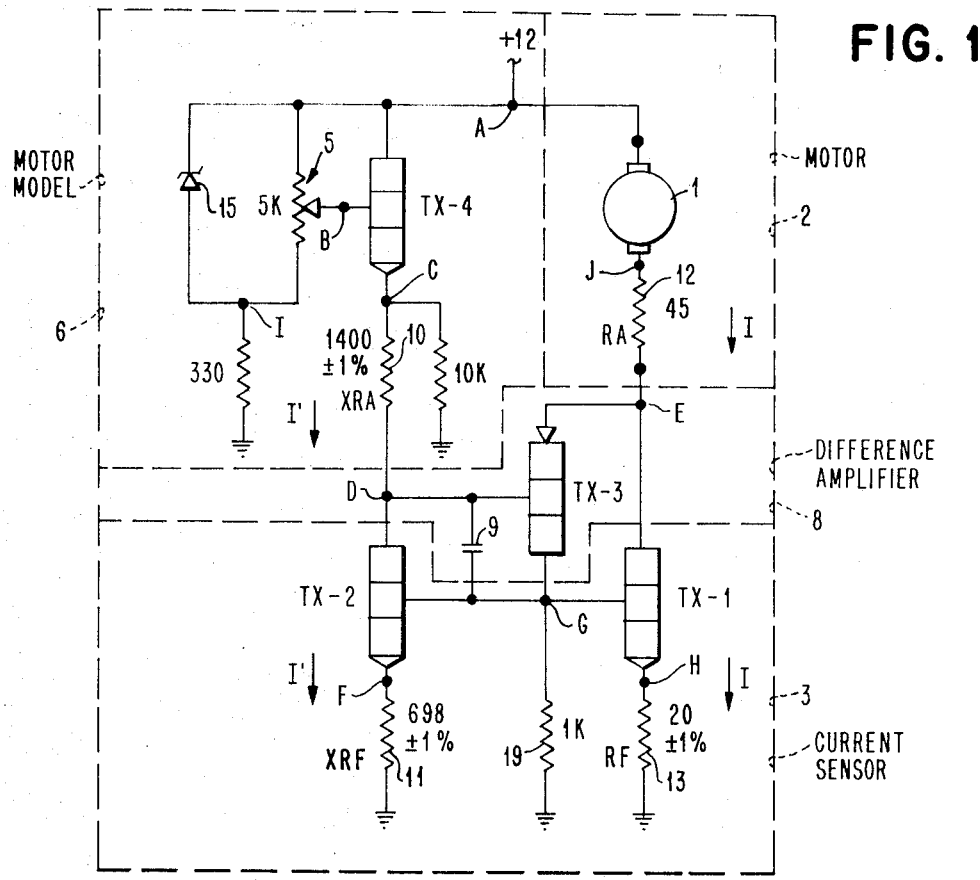
FIG. 1 is a detailed circuit diagram of a preferred embodiment of the motor control circuit incorporating the present inventive arrangements.

The following table sets forth some typical ranges of operation and potentials encountered in the motor circuit of FIG. 1 at a nominal selected speed that is desired to be maintained, at maximum loading (slower speed) and underloading (higher speed).

TABLE A

|  | Under load | Nominal | Maximum loading |
|---|---|---|---|
| Condition | Tends to speed up. | Normal— 2,350 r.p.m. | Tends to slow down. |
| Load | 3 gm.-cm | 5.5 gm.-cm | 10 gm.-cm. |
| Motor current | 20 ma | 41 ma | 70.5 ma. |
| Back EMF | 4.52 v | [1] 4.52 volts | 4.52 v. |
| Terminals: |  |  |  |
| A-B Back EMF | 4.52 v | 4.52 v | 4.52 v. |
| A-I Zener voltage | 7.5 v | 7.5 v | 7.5 v. |
| A-E | 5.42 v | [2] 6.37 v | 7.02 v. |
| A-C | 5.12 v | 5.12 v | 5.12 v. |
| A-D | 6.02 v | [3] 6.97 v | 7.62. |
| H to ground | .4 v | .82 v | 1.41 v. |
| G to ground | 1.05 v | 1.47 v | 2.07 v. |
| F to ground | .4 v | .82 v | 1.42 v. |

[1] Want to maintain.
[2] Back EMF plus IR drop across resistor 12.
[3] A-E plus $V_{be}$ of TX 3.

It will be understood, of course, that the foregoing parameters are merely parameters that were found suitable for operation of a DC motor in conjunction with the motor regulation circuit according to the present invention and that a wide range of other parameters can be selected as desired. In the case shown, it is assumed that a normal speed of 2,350 revolutions per minute is desired. This is established with a back EMF of 4.52 volts. Under such conditions, the load is assumed to be 5.5 grams-centimeters and the motor current is assumed to be 41 milliamperes. If maximum loading conditions are encountered, the motor tends to slow down. This is indicated as a load of 10 grams-centimeters. The motor current tends to increase to 70.5 milliamperes, but it is desired that in order to keep the motor speed at the nominal speed of 2,350 r.p.m., the back EMF remain at 4.52 volts.

On the other hand, if an underload condition occurs, the motor tends to speed up. With a load of 3 grams-centimeters, motor current assumes a 20 milliampere level. However, it is essential that motor speed be maintained at or near 2,350 r.p.m. by continuing to maintain the 4.52 volt back EMF. For more detailed consideration of the motor circuit operation, various terminals in the motor circuit have been designated A- —J and potentials existing between the terminals including ground are also indicated in table A.

The first leg of the circuit includes motor 1 (in a motor section 2) connected in series with transistor TX–1. Transistor TX–1 senses changes in the motor current in this first leg and such changes are taken into account in the circuit for maintaining a desired back *EMF* for motor 1. A second leg of the circuit includes the transistors TX–2 and TX–4 connected in series, with transistor TX–2 cooperating with transistor TX–1 as a current sensor section 3 to establish the desired corrective action in the circuit to maintain the nominal back *EMF*, which in this case is 4.52 volts. Transistor TX–4 serves under control of potentiometer 5 to establish a reference potential and acts as a motor model to maintain the desired potential against which the motor back *EMF* is compared and matched. The motor model section of the circuit is designated 6. Included in the circuit is a transistor TX–3 serving as the active component of a difference amplifier section 8 and having an associated capacitor 9 for regulating the responsiveness of the circuit to changes in current and thereby the time required for corrective action to be taken.

Of interest is the fact that the second leg including the transistors TX–2 and TX–4 has components that are selected with a predetermined ratio of impedance with respect to those that are connected in series in the first leg including the motor. This particularly involves the resistors 10 and 11 further designated for convenience as $XRA$ and $XRF$, respectively. In the first leg, the counterpart resistors are 12 and 13 further designated as $RA$ and $RF$, respectively. The designations are chosen to reflect the fact that resistor $XRA$ has an impedance characteristic with a predetermined ratio $X$ with respect to resistor $RA$. As an example, the factor $X$ in the present case may be assumed to be 35 to 1 and the ohmic values of these resistors (1,400 ohms and 45 ohms, respectively) reflect this ratio. The same ratio considerations apply to resistor $XRF$ and resistor $RF$ with the factor $X$ being in the range of 35 to 1 (698 ohms to 20 ohms). Due to other considerations in the circuit, the ohmic values selected will not be exactly 35 to 1 but are close enough for discussion purposes.

A Zener diode 15 having a potential rating of 6.0 volts establishes a reference for the back *EMF* reference potential between terminals A and B.

During operation, the current $I$ flowing through the right-hand leg that includes motor 1 fluctuates with changes in load conditions as indicated previously in the discussion involving table A. As current $I$ varies during operation, transistors TX–1 and TX–2 serve to sense and scale the current $I$ and maintain the $IR$ drops in the circuit and the back *EMF* across motor 1 equal to the reference potential selected by the setting of potentiometer 5 and available across terminals A and B. Thus, transistors TX–1 and TX–2 take the motor current $I$ divided by $X$ and maintain the resultant in resistor $XRA$. With a current $I$ flowing through the right-hand leg of the circuit including motor 1 a current $I'$ bearing a predetermined relationship to current $I$ flows in the left-hand leg including transistors TX–2 and TX–4. Current $I'$ is determined as follows:

$$I'(XRF) = IRF$$

$$I' = I\left(\frac{RF}{XRF}\right)$$

$$I' = I\left(\frac{1}{X}\right)$$

$$I' = \frac{I}{X}$$

With the foregoing relationship between current $I$ and current $I'$, the potentials in the lower portion of the motor circuit incorporated in that section serving as the current sensor portion 3 and including transistors TX–1 and TX–2 is determined as follows:

$$I \cdot RF = V_{H \text{ to ground}}$$

$$-(V_{H \text{ to ground}}) - (V_{H \text{ to G}}) + (V_{G \text{ to F}}) + (V_{F \text{ to ground}}) = 0$$

$$-(V_{H \text{ to ground}}) + (V_{F \text{ to ground}}) = 0$$

$$V_{H \text{ to ground}} = V_{F \text{ to ground}}$$

It is noted in the above equations that the circuit action in the current sensor portion 3 involves the balancing of various potentials between transistors TX–1, TX–2, and the various terminals F, G, and H as well as ground in the circuit. The potentials existing between terminals G and H on the one hand and F and G on the other hand are essentially the corresponding base-to-emitter voltages extant in transistors TX–1 and TX–2 which are substantially identical. These potentials cancel out in the equation and it is seen that ultimately the potential between H to Ground equals that between terminal F to Ground as shown. The resistor 19 simply serves as a bleeder resistor for the leakage current of transistor TX–3 and is not significant in the circuit action. Also, the potential between terminals D and F are likewise not significant in the circuit topology at this point.

Transistor TX–3 is incorporated in the circuit to govern the potential existing between terminals D and E, maintaining such potential as near constant as possible.

The balancing of potentials in the circuit just discussed, that is the current sensor portion 3, essentially involves balancing of potentials in the lower section of the motor regulating circuit. Ultimately, this achieves a balance of potentials in the upper portion of the circuit involving the loop from terminals A, B, C, D, E, J, and eventually terminal A again. The upper relationship or balancing of potentials is reflected in the following equations:

$$+V_{A \text{ to } B} + V_{B \text{ to } C} + \frac{I}{X}(XR_A) - V_{D \text{ to } E} - IR_A - EMF = 0$$

$$+V_{A \text{ to } B} + V_{be4} + IR_A - V_{be3} - IR_A - EMF = 0$$

$$+V_{A \text{ to } B} + V_{be4} - V_{be3} - EMF = 0$$

$$+V_{A \text{ to } B} - EMF = 0$$

$$V_{A \text{ to } B} = EMF$$

Note: $V_{A \text{ to } B} = V_{REF}$

As shown in the foregoing equations, a balancing of potentials is achieved in the upper portion of the circuit involving the motor model section 6 and the motor portion 2 that is comparable to the balancing of potentials in the current sensor portion 3. The potential $V$ between terminals A and B, which serves as the reference potential against which the motor *EMF* is compared, proves to be equal to *EMF* under all of the loading conditions with the balancing effects indicated in the equations. This is due again to the fact that current $I$ times resistor $RA$ is equivalent to the factored current $I/X$ times the resistor $XRA$ which has a multiple factored relationship to the resistor $RA$.

Another way of expressing the potential balancing effect is that the voltage drop in the supply of the base of transistor TX–4 plus the base-to-emitter voltage of transistor TX–4 plus the power drop across resistor $XRA$ minus the base-to-emitter voltage of transistor TX–3 and minus the $IR$ drop of motor 1 equals zero. The base-to-emitter voltages of transistors TX–4 and TX–3, since they are of opposite polarity, cancel out.

The net effect of the foregoing arrangement is that the back *EMF* of motor 1 is equal to the Zenered voltage at the base of transistor TX–4 that can be made very stable in the circuit arrangement. Therefore, the back *EMF* of motor 1 is essentially identical to the Zener voltage established by potentiometer 5. Another way of expressing it is that the potential between the collector and base of transistor TX–4 is equivalent to the back *EMF* of motor 1.

To summarize, the foregoing motor speed regulating action of the circuit, the balancing of potentials in the circuit, both in the lower and upper portions thereof, insure that the back *EMF* of motor 1 is maintained at all times to the desired reference potential between terminals A and B.

The 10K resistor from terminal C to ground does not appear in any of the operating conditions but is necessary to get the circuit to start since under startup conditions, transistor TX–2 is not conducting. There would not be any base current available for TX-3 if it were not for the 10K resistor. Without base current for TX-3, TX-1 and TX-2 would never turn on and the system would not start. The 10K resistor also functions to provide a minimum, or idling, current for TX-4 to stabilize its $V_{be}$.

TEMPERATURE COMPENSATION CONSIDERATIONS

As a corollary advantage of the motor regulating circuit, temperature compensation is inherently provided in the circuit primarily due to the balancing of potentials that were previously discussed.

Temperature Compensation in Upper Loop

Figure 4:
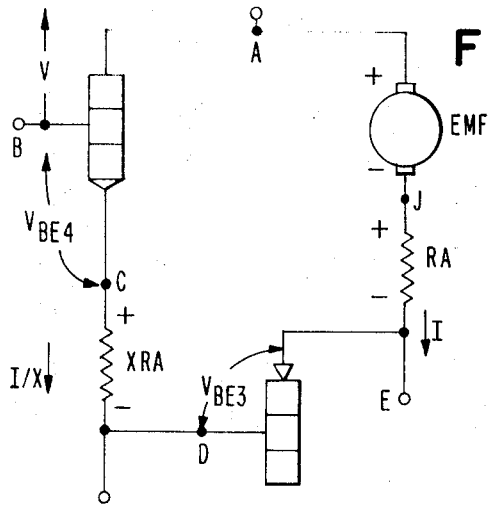
FIGS. 4 and 5 represent upper and lower motor control circuit portions, respectively, illustrating the automatic temperature compensation aspects of the circuit.

FIG. 4 illustrates the relationships existing in the upper loop of the circuit that bear on temperature conditions in the circuit. The temperature encountered during operation of the circuit primarily affects the base-to-emitter voltages of transistors TX-3 and TX-4 (Assuming the reference voltage is stable with respect to temperature). As noted in a previous series of equations (page 16, lines 1 —6), these potentials are equal and opposite to one another and, therefore, have an inherent compensating effect when considered in the operation of the circuit.

$V_{B \, to \, C} = V_{be}$ of TX-4
$V_{D \, to \, E} = V_{be}$ of TX-3

$$V_{A \, to \, B} + V_{B \, to \, C} + \frac{I}{X}(XRA) - V_{D \, to \, E} - IRA - EMF = 0$$

$V_{A \, to \, B} = EMF$

Referring to the foregoing equations, it is noted that the potential $V_{B \, to \, C}$ is equal to the base-to-emitter voltage of transistor TX-4 while the potential $V_{D \, to \, E}$ equals the base-to-emitter voltage of transistor TX-3. As indicated, these potentials are of equal and opposite effect in the equation and, therefore, cancel one another out during operation of the circuit. Also, as indicated in the previous set of equations, the potentials established in resistor $XRA$ and $RA$ tend to cancel out ultimately achieving a balanced condition where the reference potential between terminals A and B is equal to the back $EMF$ of the motor.

Temperature Compensation in Lower Loop

Figure 5:
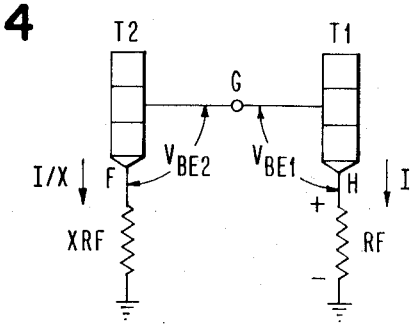

FIG. 5 illustrates the temperature compensation factors in the lower loop including transistors TX-1 and TX-2. The following relationships pertain:

$V_{G \, to \, H} = V_{be}$ of TX-1
$V_{G \, to \, F} = V_{be}$ of TX-2

$$IRF + V_{G \, to \, H} - V_{G \, to \, F} - \frac{I}{X}(XRF) = 0$$

$$0 = 0$$

In the foregoing equations, the potentials established for resistors RF and XRF essentially cancel one another out as previously discussed. The base-to-emitter changes of transistor TX-1 are of equal and opposite polarity to those encountered for transistor TX-2, again effectively cancelling one another out thereby maintaining stability in the lower loop of the circuit as far as temperature considerations are concerned.

VARIATIONS ON SETTING OF REFERENCE POTENTIAL

Figure 6:
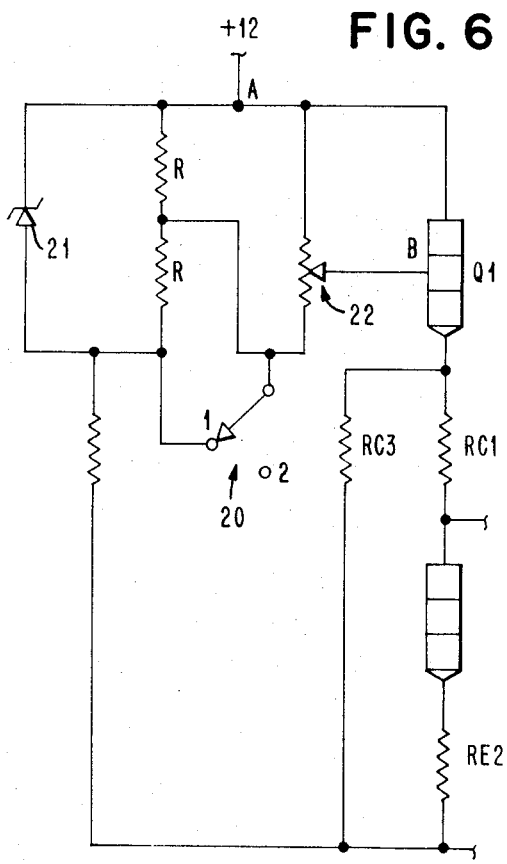
FIGS. 6, 7, and 8 show alternative arrangements for establishing desired motor speeds at particular points of operation or within desired ranges of operation, as desired.
Figure 7:
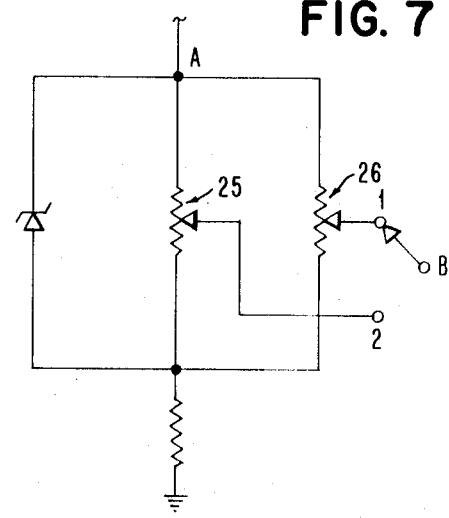
Figure 8:
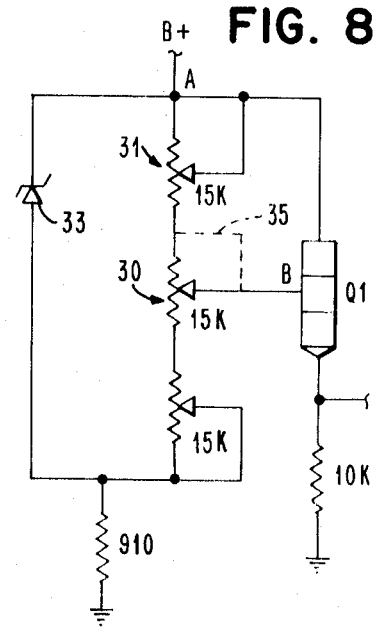

FIGS. 6, 7, and 8 illustrate a number of configurations for establishing desired reference potentials, particularly between terminals A and B.

The circuit of FIG. 6 is intended to provide two settings of potential in the motor regulating circuit of FIG. 1 for establishing two related motor speed conditions. The circuit includes a switch 20, settable to positions indicated by terminals 1 and 2. When switch 20 is set to terminal 1, the entire voltage provided by a Zener diode 21 is supplied across the potentiometer 22 to the base of transistor Q1. If switch 20 is set to terminal 2, however, then only one-half of the potential from Zener 21 will be provided to potentiometer 22. Hence, the collector-to-base potential, that is between terminals A and B, to transistor Q1 will be one-half of that existing when switch 20 is connected to terminal 1, thereby establishing a motor speed of one-half of the normal speed.

FIG. 7 illustrates another arrangement in which two potentiometers 25 and 26 are selected alternatively by appropriate setting of a switch 27. The potentiometers 25 and 26 may be set for particular speeds of a motor, not shown. If switch 27 is connected to terminal 1, a first speed is established due to a first potential between terminals A and B. If switch 27 is connected to terminal 2, a second speed is established due to a different potential existing between terminals A and B.

FIG. 8 illustrates another possible configuration for establishing a desired reference potential between terminals A and B. Included in this circuit is a transistor Q1 having its base connected through a potentiometer 30 in series with a second potentiometer 31 to terminal A. Zener diode 33 establishes a stable reference potential. In the circuit of FIG. 8, it is assumed that potentiometer 30 is moved in a somewhat steady, linear fashion from one extreme of its range of movement to the other extreme. This will vary the potential available to the base of transistor Q1 in a linear fashion and thereby provide a reference potential in the circuit of FIG. 1 that will achieve a linear change in motor speed throughout the time required to move potentiometer 30 through its range of movement. It is entirely possible to have a circuit connection 35 to the base of transistor Q1 wherein a hyperbolic variance in control is established by potentiometer 30; and since the reference potential between terminals A and B will also vary in a hyperbolic fashion, the speed of the associated motor will do likewise. The other two potentiometers set the upper and lower limits of the speed variation.

OPERATION OF THE CIRCUIT

The operation of the circuit of FIG. 1 when changing from nominal to maximum loading conditions or nominal to underload conditions is described directly below. The circuit is effective to maintain the motor speed at a selected level within ± 1 percent, as an example.

OPERATION — CHANGE IN LOAD FROM NOMINAL TO MAXIMUM

When the load across the motor on the motor shaft increases by a torque increase in the circuit, the speed decreases and then motor current $I$ increases. This causes an increase in current in the collector circuit of TX-1 and hence an increase in current in the emitter circuit of TX-1. Due to the increased current, the voltage H to Ground increases. Because of the constant $V_{be}$ or the nature of the $V_{be}$ at TX-1 being about a constant for small current changes, the voltage G to Ground increases by the same amount as H TO Ground. The $V_{0_{be}}$ of TX-2 is also a constant for small current changes, hence the voltage F to Ground increases by the same amount as G to Ground; therefore F to Ground increases by the same total voltage as does H to Ground. This causes an increase in current in TX-2 to counterbalance the increase in current in TX-1, and the percentage is exactly the same although the actual magnitude of the current is divided by the ratio between RF and XRF. When the current has increased in the motor, the $IR$ drop of the motor has instantaneously increased. The terminal voltage A to E across the motor has remained a constant over approximately a 10 millisecond period because it has not received a signal to increase yet, but the $IR$ drop is immediately increased when $I$ increased in the motor and TX-1. So the voltage drop J to E has increased. Since the terminal voltage has remained a constant, the back $EMF$ has had no other choice but to drop by the same total voltage as the $IR$ drop increased, between J and E. Then when the current in TX-1 increases, there is correspondingly the same percentage increase in current in TX-2; but it is a small time later. Therefore, the voltage drop C to D (across the 1400 resistor) goes up by the same amount as the voltage drop across the armature resistor J to E.

Therefore, at this point in time, since the voltage drop to C is a constant, the voltage at point D lowers by the same amount as the *IR* drop increase from J to E. At that point, the terminal voltage A to E has been increased by the drop that occurred across J to E; and due to the increase from A to E, the back *EMF* of the motor returns to its original value. Originally when the current was 41 milliamps, the back *EMF* was 4.52 volts. Immediately upon going to 70 milliamps, the *IR* drop increased by 1.2 volts from J to E. The back *EMF* has dropped by 1.2 volts. When the current in TX-1 increases from 41 milliamps to 70 milliamps, the current in TX-2 increases from 1.1 milliamps to 2 milliamps approximately. That increase then increases the voltage drop across the 1400 resistor which is C to D by something very close to 1.2 volts. Remember that the *IR* drop had increased by 1.2 volts from the current increase, so the terminal voltage of the motor A to E is increased by 1.2 volts which was exactly the drop of the *IR* drop. Hence the back *EMF* now goes back to 4.52 volts. So when the circuit senses an instantaneous torque change, it will instantaneously begin to change its speed. As the speed changes, the current will change due to the changing *EMF*. However, the circuit will detect the changing current and will, within a few milliseconds, adjust the terminal voltage to bring the *EMF* and speed back to their original values. This transient case, i.e., the recovery time involved, is determined by the value of capacitor C which is shown from the base of TX-3 to the base of TX-2.

NOTE: The speed change will not be instantaneous but will have a finite transient time. Therefore, the circuit response time will be fast enough to prevent appreciable speed changes due to torque perturbations in most cases.

OPERATION — CHANGE IN LOAD FROM NOMINAL TO UNDERLOAD

When the shaft torque of the motor decreases, the speed immediately begins to rise and the armature current begins to drop from 41 ma. to 20 ma. The *IR* drop across the 45 ohm armature resistance J to E begins to decrease by .8 of a volt. The terminal voltage A to E has not had a chance to change yet, and the *IR* drop is added to the back *EMF* of the motor. When the drop in current takes place, the collector current of TX-1 drops from 41 to 20 milliamps. The voltage H to Ground decreases by some .5 volt. When H to Ground decreases by .5 volt, the voltage G to Ground decreases by .5 volt, the voltage F to Ground decreases by .5 volt, and the current in TX-2 drops by the same percentage as the current drop in TX-1. Therefore, the collector current of TX-2 is down by the same percentage as the collector current drop in TX-1. The drop across the 1400 ohm resistor, C to D, therefore decreases from its initial value at the nominal load to a reduced value corresponding to the drop from 41 milliamps to 20 milliamps. Therefore, the voltage at point D increases. If the voltage at point D increases, the voltage at point E increases, hence the voltage A to E drops by the same amount as the *IR* drop in the 45 ohm resistor. This adjustment of the terminal voltage decreases the back *EMF* to exactly what it was previous to the drop in the current in the motor and the speed returns to its nominal running speed.

CIRCUIT REACTION TIME

The value of the capacitor 9 varies from circuit to circuit since it depends upon the load (motor and drive system) to which the circuit is connected, and the dynamic characteristics of the system. Typically, this circuit has 4.7 microfarad capacitor. Another version had 3.3 microfarad capacitor. An attempt is made to counterbalance the dynamic conditions of the mechanical system by the time reaction of the circuit to prevent overshooting and undershooting when the speed returns to its normal value. If the value of the capacitor is not properly chosen, the circuit may overshoot the speed and then come back in from the other direction; or it may also undershoot and come in too slowly. The capacitor actually adjusts for dynamic characteristics in the drive and is not essential for the operation of the motor control circuit as such. It does offer an added advantage in that the motor does not draw DC current as such, but has some commutation spikes riding along with the DC current. The capacitor acts as a filter and allows the control circuit to average the motor current rather than try to follow the instantaneous motor current. The capacitor serves two purposes: (1) damping of the drive circuit, and (2) acting as a filter to keep noise from affecting the circuit.

While the invention has been particularly shown and described with reference to several embodiments, it will be understood by those skilled in the art that various changes in format and detail may be made without departing from the spirit and scope of the invention.

We claim: a symmetrically arranged motor control circuit for maintaining the speed of a motor at a substantially constant selected speed, comprising:

a source of potential;

a first circuit leg connected to said source and having first and second sections arranged in series and intermediately connected at a first junction point;

a second circuit leg connected to said source and having first and second sections arranged in series and intermediately connected at a second junction point;

motor means to be regulated in said first leg first section;

means in said second leg first section for providing a stable selected reference potential;

a first active current control element in said first leg second section;

a second active current control element in said second leg second section; and control means connected between said first and second junctions and in controlling relation to said first and second active elements and responsive to changes in the back EMF of said motor to regulate said first and second active element elements to establish current relationships in said first and second circuit legs that maintain equal to said selected reference potential.

2. The circuit of claim 1, wherein:

said first and second active elements and said control means comprise transistors with said motor means being connected in the collector path of said first transistor, said reference means being connected in the collector path of said second transistor; and wherein said control transistor has its base-to-emitter path interconnecting said first and second junction points and its collector connected to the bases of said first and second transistors for control of current flow therethrough.

3. The circuit of claim 1, wherein:

said first circuit sections of said first and second circuit legs comprise a balanced arrangement with said motor connected in said first section of said first circuit leg and said reference means serving as a motor model in the first section of said second circuit leg; and wherein said first and second active elements serve as a current sensor arrangement.

4. The circuit of claim 1, wherein said first and second circuit legs include components selected so that the components in said second circuit leg have a resistive value that is a multiple of the resistive value of the components in said first circuit leg.

5. The circuit of claim 1, further comprising means in said circuit for controlling said circuit sections and particularly said active elements to achieve a rapid startup time upon initial activation.

6. The circuit of claim 1, wherein compensation is automatically provided for variations in temperature with the following arrangement said first sections of said first and second circuit legs comprise a series arrangement designated a first loop with said control means in series therewith, the arrangement being such that positive and negative potentials extant in said first loop are balanced one against the other during operation of said circuit to achieve automatic temperature compensation.

7. The circuit of claim 1, wherein provision is made for automatic temperature compensation with the following arrangement said first and second active elements comprise a series second loop having positive and negative potentials therein that are effectively balanced against one another to achieve automatic temperature compensation.

8. The circuit of claim 1, wherein:
said first sections of said first and second circuit legs comprise a series arrangement designated a first loop with said control means in series therewith, the arrangement being such that positive and negative potentials extant in said first loop are balanced one against the other during operation of said circuit to achieve automatic temperature compensation; and
said first and second active elements comprise a series second loop having positive and negative potentials therein that are effectively balanced against one another to achieve automatic temperature compensation.

9. The circuit of claim 1, further comprising an additional active circuit element in the first section of said second leg, said additional active circuit element having an associated reference element for maintaining an accurate reference potential.

10. The circuit of claim 9, wherein said additional circuit element comprises a transistor and said reference element comprises a Zener diode.

11. The circuit of claim 9, further comprising means in the first section of said second circuit leg for establishing a desired reference potential over a predetermined range of reference potentials.

12. The circuit of claim 9, further comprising means associated with said reference section of said circuit for establishing a plurality of predetermined reference potentials in order to thereby establish a motor speed at a desired plurality of speed settings.

13. The circuit of claim 12, further comprising potentiometer means associated with said selector means to establish a range of settings within each of said plurality of selected settings.

14. The circuit of claim 12, wherein one of said plurality of means moves through a range of movement in a real time fashion to vary the reference potential with the passage of time or with some other parameter.

15. The circuit of claim 14, wherein said real time potentiometer means is varied in a linear fashion with the passage of time or with some other parameter.

16. The circuit of claim 14, further comprising means associated with said real time potentiometer for establishing a hyperbolic variance in control of said circuit.